Patented July 3, 1951

2,558,863

UNITED STATES PATENT OFFICE 2,558,863

PROCESS FOR REFINING PETROL

Lars Börje Lundquist, Narkes-Kvarntorp, Sweden, assignor to Svenska-Skifferolje Aktiebolaget, Narkes-Kvarntorp, Sweden, a corporation of Sweden No Drawing. Application February 14, 1949, Serial No. 76,421. In Sweden February 18, 1948

1 Claim. (Cl. 196—32)

The present invention relates to the refining of petrol or gasoline containing mercaptans as well as carbon bisulphide as impurities. A common method for refining such kinds of petrols is carried out as follows:

The petrol is first treated with aqueous soda lye to remove hydrogen sulphide. Then the petrol is treated with concentrated sulphuric acid and the acid tar formed is separated off. After the treatment with sulphuric acid, the petrol has hitherto been treated with alcoholic lye, preferably soda or potash lye, in order to convert the carbon bisulphide into xantogenate, followed by a final distillation and so-called doctor-treatment, i. e. a treatment with sodium plumbite and sulphur in order to convert the mercaptans into disulphides. However, some of the alcoholic lye will be consumed for the neutralization of acid products. Furthermore, a rather great part of said alcoholic lye will remain in the petrol even after a subsequent washing with water so that this method of treatment involves great losses of the expensive alcoholic lye.

The present invention relates to a change of the refining process in order to save the alcoholic lye required for removing the carbon bisulphide.

According to the invention the petrol is, just as earlier, first treated with concentrated sulphuric acid, whereas the following stages according to the invention differ from earlier methods. According to the invention the petrol obtained after the treatment with sulphuric acid is first treated with lye, preferably with an about 15% aqueous solution of NaOH or KOH, and is then subjected to a distillation in which the petrol is divided into two fractions, viz. a smaller, light fraction, and a heavier fraction. The light fraction, which constitutes about ⅓ of the distilled quantity, contains all of the carbon bisulphide and some volatile mercaptans, while the heavier fraction is free from carbon bisulphide and contains the heavier mercaptans. According to the invention the light fraction thus obtained is treated with alcoholic lye whereby the carbon bisulphide is converted into xantogenate and the light mercaptans into mercaptides. The remaining alcoholic lye together with xantogenate and mercaptides are washed away with water. The heavier fraction is subjected to a common doctor-treatment to convert the mercaptans thereof into disulphides.

The advantages and benefits which may be obtained according to the invention might be obvious from the description given above. The alcoholic lye will not be consumed for the neutralization of acid components. Furthermore, the alcoholic lye will be used for the treatment of a smaller fraction only of the petrol, whereby the loss due to the solubility in the petrol is reduced. The doctor-treatment also means a certain saving because it is not necessary to treat the whole quantity of the petrol with doctor-solution. A further advantage is that the treatment of the light fraction with alcoholic lye and the doctor-treatment of the heavier fraction can be carried out in one and the same plant. It is only necessary to add to the usual doctor-plant a reaction tower in order to obtain a sufficiently long reaction period between alcoholic lye and carbon bisulphide.

I claim:

Process for refining petrol which contains carbon bisulfide and mercaptans which comprises first treating the petrol with aqueous alkaline lye, treating the resulting petrol with sulfuric acid, treating the resulting petrol with aqueous alkaline lye in quantity sufficient to neutralize the acid content thereof, distilling the resulting petrol and dividing the distillate into a light fraction containing all of the carbon bisulfide and some of the light mercaptans and a heavier fraction free of carbon bisulfide but containing at least the heavier mercaptans, treating the light fraction with alcoholic lye to convert the light mercaptans therein into mercaptides and treating the heavier fraction with sodium plumbite and sulfur to convert the mercaptans therein into disulfides.

LARS BÖRJE LUNDQUIST.

REFERENCES CITED

The following references are of record in the file of this patent:

UNITED STATES PATENTS

| Number | Name | Date |
|---|---|---|
| 2,273,104 | Heilman | Feb. 17, 1942 |
| 2,315,738 | Ryan et al. | Apr. 6, 1943 |
| 2,336,109 | Lowry et al. | Dec. 7, 1943 |
| 2,347,515 | Shmidl | Apr. 25, 1944 |
| 2,393,476 | Messmore | Jan. 22, 1946 |